United States Patent
Aavula et al.

(10) Patent No.: US 11,576,224 B2
(45) Date of Patent: Feb. 7, 2023

(54) MOBILE COMMUNICATION SYSTEM WITH FALLBACK STRATEGY FOR A MOTOR VEHICLE

(71) Applicant: GM Global Technology Operations LLC, Detroit, MI (US)

(72) Inventors: Jaswanth Krishna Aavula, Macomb, MI (US); Charles A Everhart, Canton, MI (US); Sitaram Emani, South Lyon, MI (US); Vishnu Chikondla, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 125 days.

(21) Appl. No.: 17/084,159

(22) Filed: Oct. 29, 2020

(65) Prior Publication Data
US 2022/0141906 A1    May 5, 2022

(51) Int. Cl.
| | |
|---|---|
| H04W 4/40 | (2018.01) |
| H04W 36/34 | (2009.01) |
| H04W 8/18 | (2009.01) |
| H04L 65/1016 | (2022.01) |
| H04L 12/28 | (2006.01) |
| H04M 3/42 | (2006.01) |
| H04W 76/18 | (2018.01) |
| H04M 7/00 | (2006.01) |
| H04L 67/12 | (2022.01) |

(52) U.S. Cl.
CPC ........... *H04W 76/18* (2018.02); *H04M 7/006* (2013.01); *H04W 4/40* (2018.02); *H04L 67/12* (2013.01)

(58) Field of Classification Search
CPC ..... H04W 60/06; H04W 48/18; H04W 76/18; H04W 76/30; H04W 12/63; H04W 76/50; H04L 65/1006; H04L 65/1016; H04L 2207/18; H04L 67/18; H04L 65/40; H04L 65/104; H04M 2207/18; H04M 7/0024
USPC ........................................................ 455/435.1
See application file for complete search history.

(56) References Cited

U.S. PATENT DOCUMENTS

| | | | |
|---|---|---|---|
| 2013/0121177 A1* | 5/2013 | Morton | H04L 43/16 370/252 |
| 2019/0251265 A1* | 8/2019 | Ploucha | G06F 21/577 |
| 2020/0305032 A1* | 9/2020 | Kuppelur | H04W 76/38 |
| 2020/0367316 A1* | 11/2020 | Cili | H04L 67/10 |
| 2021/0235541 A1* | 7/2021 | Seol | H04W 8/18 |
| 2021/0345185 A1* | 11/2021 | Kodali | H04W 36/0022 |

* cited by examiner

Primary Examiner — Khaled M Kassim
Assistant Examiner — Jason A Harley
(74) *Attorney, Agent, or Firm* — Vivacqua Crane, PLLC

(57) ABSTRACT

A method of operating a mobile communication system of a motor vehicle is provided for initiating a voice call with a third party. The system includes an ECU, and the ECU includes a controller and a memory storing computer code. The method includes the steps of: (a) initiating a timer; (b) operating the ECU in a first mode in which the ECU attempts to engage in a VoNR call via a first network; (c) repeating step (b) within a predetermined amount of time until the ECU successfully engages in the VoNR call; and (d) operating the ECU in a second mode to attempt to engage in a VoLTE call via a second network in response to the controller determining that the ECU in the first mode did not successfully engage in the VoNR call within a predetermined amount of time.

17 Claims, 3 Drawing Sheets

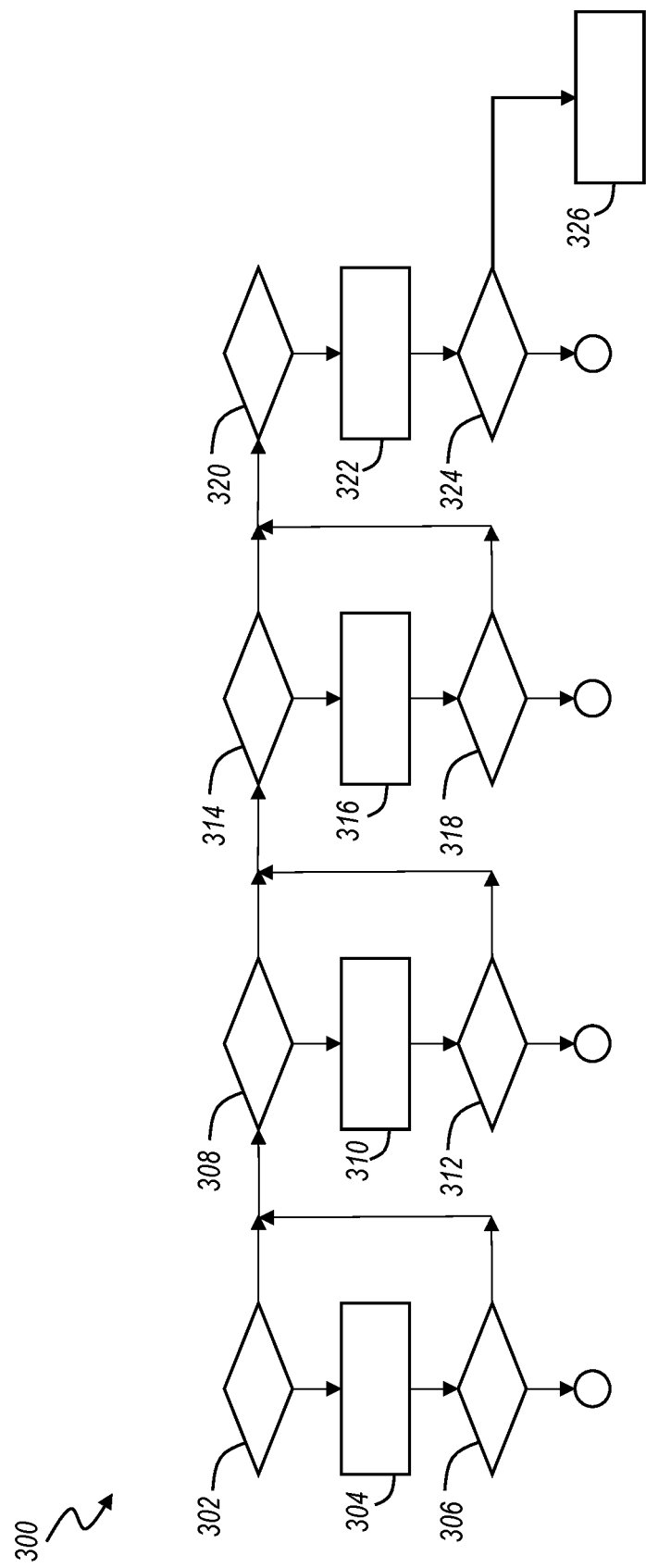

MOBILE COMMUNICATION SYSTEM WITH FALLBACK STRATEGY FOR A MOTOR VEHICLE

INTRODUCTION

The present disclosure generally relates to mobile communication systems of motor vehicles, and more particularly relates to a mobile communication system that supports voice calls on multiple voice channels to address network outages and reduce costs.

Mobile communication devices for motor vehicles can have a telematics module that supports emergency voice calls to call centers for roadside assistance, crash response, and stolen vehicle assistance. Because the telematics module can be camped on a single voice channel and a growing number of devices are consuming network bandwidth, cellular outages can occur and disrupt voice calls. For instance, the telematics module may be camped onto a Long Term Evolution network (LTE network) or similar Radio Access Technology (RAT), and the voice calls may fail if there is an outage on the network.

Thus, while existing mobile communication systems for motor vehicles achieve their intended purpose, there is a need for a new and improved mobile communication system with a fallback strategy that addresses these issues.

SUMMARY

According to several aspects of the present disclosure, there is provided a method of operating a mobile communication system of a motor vehicle to initiate a voice call with a third party. The system includes an electronic control unit (ECU) served by first and second IP Multimedia Subsystem (IMS) networks, and the ECU includes a controller and a memory for storing computer code. The method includes the steps of: (a) initiating, using the controller, a timer; (b) operating, using the controller, the ECU in a first IMS mode in which the ECU attempts to engage in a Voice Over New Radio (VoNR) call via the first IMS network; (c) repeating step (b) within a predetermined amount of time until the ECU successfully engages in the VoNR call; and (d) operating, using the controller, the ECU in a second IMS mode to attempt to engage in a Voice Over Long Term Evolution (VoLTE) call via the second IMS network, in response to the controller determining that the ECU in the first mode did not successfully engage in the VoNR call within the predetermined amount of time.

In one aspect, the controller initiates a counter to count a number of unsuccessful attempts to engage in the VoNR call. The controller increments the counter for each unsuccessful attempt, and the controller operates the ECU in the second mode to attempt to engage in the VoLTE call, in response to the controller determining that the ECU in the first mode did not successfully engage in the VoNR call within a predetermined number of attempts.

In another aspect, the controller resets the timer and attempts to engage in the VoLTE call, in response to the controller determining that the ECU did not successfully engage in the VoNR call within the predetermined amount of time. The controller operates the ECU in an Internet Protocol mode (IP mode) to attempt to engage in a Voice Over Internet Protocol call (VoIP call) via an Internet Protocol network (IP network), in response to the controller determining that the ECU did not successfully engage in the VoLTE call within the predetermined amount of time.

In another aspect, the controller initiates a counter to count a number of unsuccessful attempts to engage in the VoLTE call. The controller increments the counter for each unsuccessful attempt, and the controller operates the ECU in the IP mode to attempt to engage in the VoIP call, in response to the controller determining that the ECU in the second IMS mode did not successfully engage in the VoLTE call within a predetermined number of attempts.

In another aspect, the controller resets the timer and attempts to engage in the VoIP call, in response to the controller determining that the ECU did not successfully engage in the VoLTE call within the predetermined amount of time. The controller operates the ECU in a third IMS mode to attempt to engage in a Circuit Switched Fallback (CSFB) call via a third IMS network, in response to the controller determining that the ECU in the IP mode did not successfully engage in the VoIP call within the predetermined amount of time.

In another aspect, the controller initiates a counter to count a number of unsuccessful attempts to engage in the VoIP call. The controller increments the counter for each unsuccessful attempt, and the controller operates the ECU in the third IMS mode to attempt to engage in the CSFB call, in response to the controller determining that the ECU in the IP mode did not successfully engage in the VoIP call within a predetermined number of attempts.

In another aspect, the steps of operating the ECU in first and second IMS modes on first and second IMS networks comprise operating the ECU on a single non-standalone network.

According to several aspects of the present disclosure, there is provided a method of operating a mobile communication system of a motor vehicle is provided. The mobile communication system includes an ECU served by first and second networks. The ECU includes a controller and a memory storing computer code for execution by the controller. The method includes: (a) initiating, using the controller, a timer; (b) operating, using the controller, the ECU in a first mode in which the ECU attempts to engage in the voice call via the first network; (c) repeating step (b) within a predetermined amount of time until the ECU successfully engages in the voice call; and (d) operating, using the controller, the ECU in a second mode to attempt to engage in the voice call via a second network, in response to the controller determining that the ECU in the first mode did not successfully engage in the voice call within the predetermined amount of time.

In one aspect, the method provides the first network in the form of an IMS network and the second network in the form of an IP network. The controller determines an availability of an IP network via a Wi-Fi connection and an availability of the IMS network based on at least one of a bit error rate, a cellular signal, and a service fee associated with the IMS network. The controller further operates the ECU to attempt to engage in a VoIP call via the IP network, in response to the controller determining that at least one of: the bit error rate is above an error threshold value; the cellular signal is below a signal threshold value; the service fee is above a fee threshold value; and the IP network is available via the Wi-Fi connection. The controller operates the ECU to attempt to engage in a VoNR call via the IMS network, in response to the controller determining that at least one of: the bit error rate is below the error threshold value; the cellular signal is above the signal threshold value; the service fee is below the fee threshold value; and the IMS network is available.

In another aspect, the controller initiates a counter to count a number of unsuccessful attempts by the ECU in the first mode to engage in the voice call via the first network. The controller increments the counter for each unsuccessful attempt, and the controller operates the ECU in the second mode to attempt to engage in the voice call via the second network, in response to the controller determining that the ECU in the first mode did not successfully engage in the voice call within a predetermined number of attempts.

In another aspect, the controller resets the timer and operates the ECU in the second mode to attempt to engage in the voice call, in response to the controller determining that the ECU in the first mode did not successfully engage in the voice call within the predetermined amount of time. The controller operates the ECU in a third mode to attempt to engage in the voice call via a third network, in response to the controller determining that the ECU in the second mode did not successfully engage in the voice call within the predetermined amount of time.

In another aspect, the controller initiates a counter to count a number of unsuccessful attempts by the ECU in the second mode to engage in the voice call via the second network. The controller increments the counter for each unsuccessful attempt, and the controller operates the ECU in the third mode to attempt to engage in the voice call via the third network, in response to the controller determining that the ECU in the second mode did not successfully engage in the voice call within a predetermined number of attempts.

In another aspect, the controller resets the timer and operates the ECU in the third mode to attempt to engage in the voice call, in response to the controller determining that the ECU in the second mode did not successfully engage in the voice call within the predetermined amount of time. The controller operates the ECU in a fourth mode to attempt to engage in the voice call via a fourth network, in response to the controller determining that the ECU in the third mode did not successfully engage in the voice call within the predetermined amount of time.

In another aspect, the controller initiates a counter to count a number of unsuccessful attempts by the ECU in the third mode to engage in the voice call. The controller increments the counter for each unsuccessful attempt, and the controller operates the ECU in the fourth mode to attempt to engage in the voice call, in response to the controller determining that the ECU in the third mode did not successfully engage in the voice call within a predetermined number of attempts.

According to several aspects of the present disclosure, a mobile communication system of a motor vehicle includes an ECU served by first and second networks for initiating a voice call with a remote third party. The ECU includes a controller and a memory storing computer code for execution by the controller. The computer code is configured to: (a) initiate a timer; (b) operate the ECU in a first mode in which the ECU attempts to engage in the voice call via the first network; (c) repeat step (b) within a predetermined amount of time until the ECU successfully engages in the voice call; and (d) operate the ECU in a second mode, in response to the controller determining that the ECU in the first mode did not successfully engage in the voice call within the predetermined amount of time.

In one aspect, the controller initiates a counter to count a number of unsuccessful attempts by the ECU in the first mode to engage in the voice call. The controller operates the ECU in the second mode to attempt to engage in the voice call via the second network, in response to the controller determining that the ECU in the first mode did not successfully engage in the voice call within a predetermined number of attempts.

In another aspect, the controller resets the timer and resets the counter to count a number of unsuccessful attempts by the ECU in the second mode to engage in the voice call, in response to the controller determining that the ECU in the first mode did not successfully engage in the voice call within the predetermined amount of time. The controller operates the ECU in a third mode to attempt to engage in the voice call via a third network, in response to the controller determining that: the ECU in the second mode did not successfully engage in the voice call within the predetermined amount of time; or the ECU in the second mode did not successfully engage in the voice call via the second network within a predetermined number of attempts.

In another aspect, the controller resets the timer and resets the counter to count a number of unsuccessful attempts by the ECU in the third mode to engage in the voice call, in response to the controller determining that the ECU in the second mode did not successfully engage in the voice call within the predetermined amount of time. The controller operates the ECU in a fourth mode to attempt to engage in the voice call via a fourth network, in response to the controller determining that: the ECU in the third mode did not successfully engage in the voice call within the predetermined amount of time; or the ECU in the third mode did not successfully engage in the voice call via the third network within a predetermined number of attempts. The steps of operating the ECU in first and second modes on the associated first and second networks comprise operating the ECU on a single non-standalone network.

In another aspect, the voice call in the first, second, third, and fourth modes engages in an associated one of a VoNR call, a VoLTE call, a VoIP call, and a CSFB call.

In another aspect, two of the networks include an IMS network and an IP network. The computer code is configured to determine an availability of the IMS network based on at least one of a bit error rate, a cellular signal, and a service fee associated with the IMS network. The computer code is further configured to determine an availability of the IP network via a Wi-Fi connection. The computer code is further configured to operate the ECU to attempt to engage in the voice call via the IP network, in response to the controller determining that at least one of: the bit error rate is above an error threshold value; the cellular signal is below a signal threshold value; the service fee is above a fee threshold value; and the IP network is available via the Wi-Fi connection. The computer code is further configured to operate the ECU to attempt to engage in the voice call via the IMS network, in response to the controller determining that at least one of: the bit error rate is below the error threshold value; the cellular signal is above the signal threshold value; the service fee is below the fee threshold value; and the IMS network is available.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 3 is a flow chart of another example of a method of operating the mobile communication system of FIG. 1.

DETAILED DESCRIPTION

Figure 1:
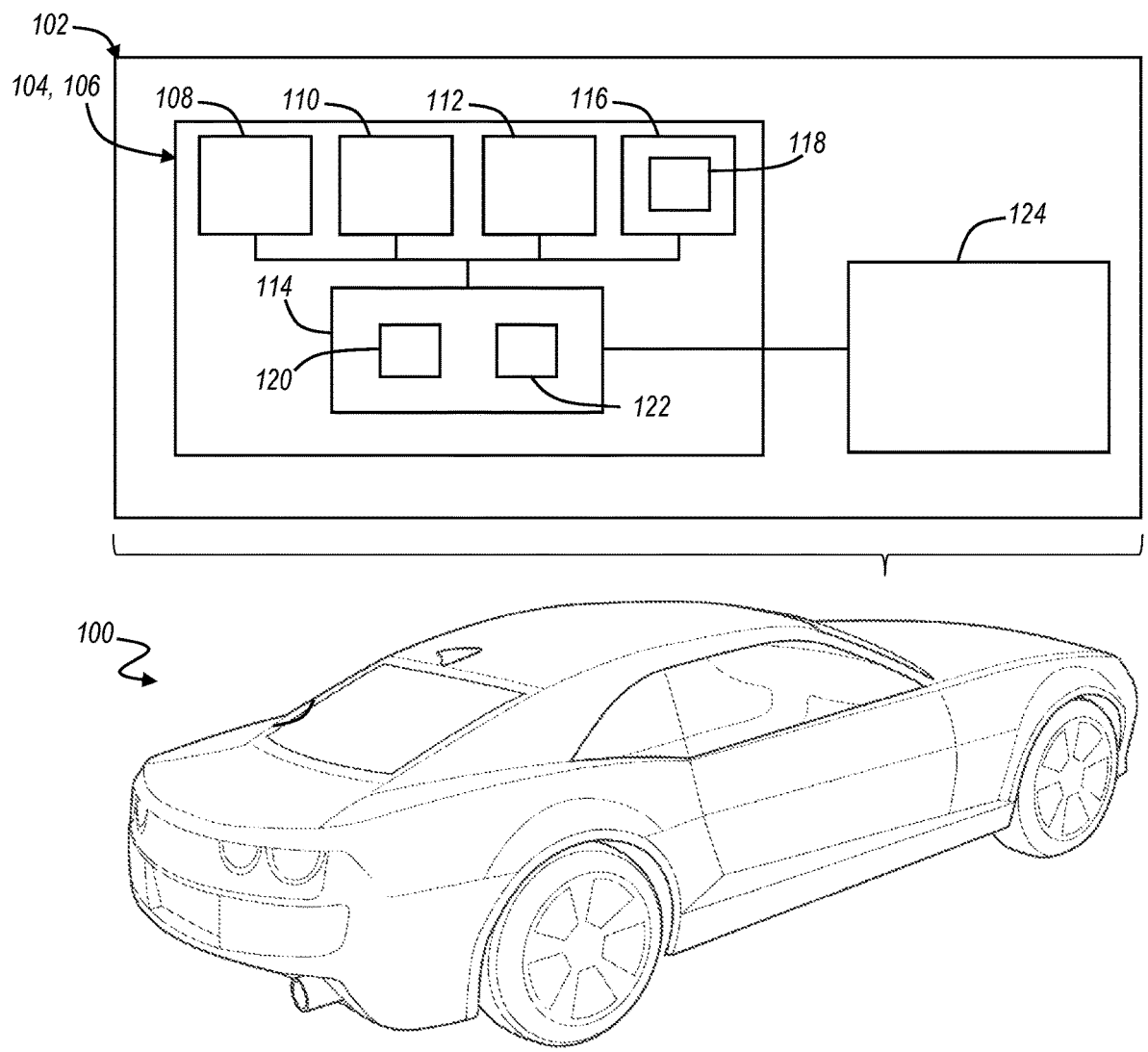
FIG. 1 is a schematic diagram of one example of a motor vehicle having a mobile communication system with a controller operating an ECU in multiple modes for initiating a voice call with a third party.

The following description is merely exemplary in nature and is not intended to limit the present disclosure, application, or uses.

An exemplary mobile communication system of a motor vehicle is selectively camped on one of multiple backup voice channels to reduce service costs and successfully engage in a voice call during a network outage. As described in detail below, the mobile communication system includes a telematics control unit that is capable of engaging in emergency voice calls to a call center for roadside assistance, crash response, and stolen vehicle assistance and personal voice calls to third party individuals. The telematics control unit includes the practical application of a controller executing a specific ordered combination of steps of operating an electronic control unit to attempt voice calls on multiple voice channels to reduce service costs and allow voice calls during a network outage. To that end, techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions.

The current description relates to examples of methods and systems that employ steps and activities carried out by modules, including computers employing discrete rules and calculations, integrated into practical applications, such as operating electronic control unit to attempt voice calls on multiple voice channels. The practical applications of the current disclosure include elements that implement or use computer and/or mental activities in conjunction with particular and integral machines and manufactured articles. The specific machines employed, and the beneficial results achieved, are tangible and physical. The disclosed activities have practical utility and solve technological challenges. More specifically, in this example, the method and system use multiple voice channels for reducing service costs and successfully engaging in a voice call during a network outage.

The module may be implemented wholly, or partially, as a hardware circuit comprising discrete components. A module may also be implemented in programmable hardware devices, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may include disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

Referring to FIG. 1, one example of a motor vehicle 100 has a mobile communication system 102 including an electronic control unit 104 (ECU). The ECU 104 is an embedded system for controlling one or more of the electrical systems or subsystems in the vehicle 100. In this example, the ECU 104 is a telematics control unit (TCU) 106 including a global positioning system (GPS) unit 108, which keeps track of the latitude and longitude values of the vehicle 100. The TCU 106 further includes a mobile communication unit 110 for engaging in a voice call with a remote third party on one of multiple networks and transmitting data to with remote database servers. The TCU 106 further includes an external interface 112 for mobile communication (GSM, GPRS, Wi-Fi, WiMax, or LTE), which provides the tracked values to a call center having a centralized geographical information system (GIS) database server. The TCU 106 further includes a controller 114 electrically connected to the GPS unit 108, the mobile communication unit 110, and the external interface 112. The controller 114 may be a microcontroller, a microprocessor, or field programmable gate array (FPGA), which processes the information and acts on the interface between the GPS. The TCU 106 further includes memory 116, which is electrically connected to the controller 114 and stores computer code 118 for execution by the controller 114.

The computer code 118 is configured to: (a) initiate a timer 120; (b) operate the ECU 104 in a first mode in which the ECU 104 attempts to engage in the voice call via a first network; (c) repeat step (b) within a predetermined amount of time until the ECU 104 successfully engages in the voice call; and (d) operate the ECU 104 in a second mode to attempt to engage in a voice call via a second network, in response to the controller determining that the ECU 104 in the first mode did not successfully engage in the voice call within the predetermined amount of time. In this example, the ECU 104 in a first IP Multimedia Subsystem mode (IMS mode) attempts to engage in a Voice Over New Radio call (VoNR call), and the ECU 104 in a second IMS mode attempts to engage in a Voice Over Long Term Evolution call (VoLTE call) via a non-standalone IP Multimedia Subsystem network (IMS network) when the ECU 104 in the first IMS mode did not successfully engage in the VoNR call within the predetermined amount of time. However, it is contemplated that the ECU 104 in the first and second modes can attempt to engage in any suitable call on any single non-standalone network or on multiple standalone networks.

The computer code 118 is further configured to initiate a counter 122 to count a number of unsuccessful attempts by the ECU 104 in the first mode to engage in the voice call via the first network. The computer code 118 is further configured to increment the counter for each unsuccessful attempt of the ECU 104 in the first mode to engage in the voice call. The computer code 118 is further configured to operate the ECU 104 in the second mode to attempt to engage in the voice call via the second network, in response to the controller determining that the ECU 104 in the first mode did not successfully engage in the voice call via the first network within a predetermined number of attempts. Continuing with the previous example, the computer code 118 can be further configured to operate the ECU 104 in a second IMS mode to attempt to engage in the VoLTE call via the second IMS network, in response to the controller 114 determining that the ECU 104 in the first IMS mode did not successfully engage in the VoNR call via the first IMS network within a predetermined number of attempts.

The computer code 118 is further configured to reset the timer 120 and reset the counter 122 to count a number of unsuccessful attempts by the ECU 104 in the second mode to engage in the voice call via the second network, in response to the controller 114 determining that the ECU 104 in the first mode did not successfully engage in the voice call within the predetermined amount of time. The computer code 118 is further configured to increment the counter for each unsuccessful attempt of the ECU 104 in the second mode to engage in the voice call. The computer code 118 is further configured to operate the ECU 104 in a third mode to attempt to engage in the voice call via a third network, in response to the controller determining that at least one of: the ECU 104 in the second mode did not successfully engage in the voice call within the predetermined amount of time; and the ECU 104 in the second mode did not successfully engage in the voice call via the second network within a predetermined number of attempts. Continuing with the previous example, the computer code 118 is further configured to operate the ECU 104 in an Internet Protocol mode (IP mode) to attempt to engage in a Voice Over Internet Protocol call (VoIP call) via an Internet Protocol network (IP network), in response to the controller 114 determining that at least one of: the ECU 104 in the second IMS mode did not successfully engage in the VoLTE via the IMS network call within the predetermined amount of time; and the ECU 104 in the second IMS mode did not successfully engage in the VoLTE call within a predetermined number of attempts. However, it is contemplated that the controller 114 can operate the ECU in any suitable third mode to engage in other suitable calls via other networks. It is contemplated that a WHATSAPP application, a SKYPE application, or other suitable VoIP supported application can be used to engage in the voice call.

The computer code 118 is further configured to reset the timer 120 and reset the counter 122 to count a number of unsuccessful attempts by the ECU 104 in the third mode to engage in the voice call via the third network, in response to the controller 114 determining that the ECU 104 in the second mode did not successfully engage in the voice call within the predetermined amount of time. The computer code 118 is further configured to increment the counter for each unsuccessful attempt of the ECU 104 in the third mode to engage in the voice call. The computer code 118 is further configured to operate the ECU 104 in a fourth mode to attempt to engage in the voice call via a fourth network, in response to the controller determining that at least one of: the ECU 104 in the third mode did not successfully engage in the voice call within the predetermined amount of time; and the ECU 104 in the third mode did not successfully engage in the voice call via the third network within a predetermined number of attempts. Continuing with the previous example, the computer code 118 is further configured to operate the ECU 104 in a third IMS mode to attempt to engage in a Circuit Switched Fallback call (CSFB call) via the IMS network, in response to the controller 114 determining that at least one of: the ECU 104 in the IP mode did not successfully engage in the VoIP call via the IP network within the predetermined amount of time; and the ECU 104 in the IP mode did not successfully engage in the VoIP call within a predetermined number of attempts. However, it is contemplated that the controller 114 can operate the ECU in any suitable fourth mode to engage in other suitable calls via other networks.

In another example, the computer code 118 is further configured to determine an availability of the IMS network based on at least one of a bit error rate, a cellular signal, and a service fee associated with the IMS network. The computer code 118 is further configured to determine an availability of the IP network via a Wi-Fi connection. The computer code 118 is further configured to operate the ECU 104 to attempt to engage in the voice call via the IP network, in response to the controller 114 determining that at least one of: the bit error rate is above an error threshold value; the cellular signal is below a signal threshold value; the service fee is above a fee threshold value; and the IP network is available via the Wi-Fi connection. Furthermore, the computer code 118 is configured to operate the ECU 104 to attempt to engage in the voice call via the IMS network, in response to the controller 114 determining that at least one of: the bit error rate is below the error threshold value; the cellular signal is above the signal threshold value; the service fee is below the fee threshold value; and the IMS network is available.

Figure 2:
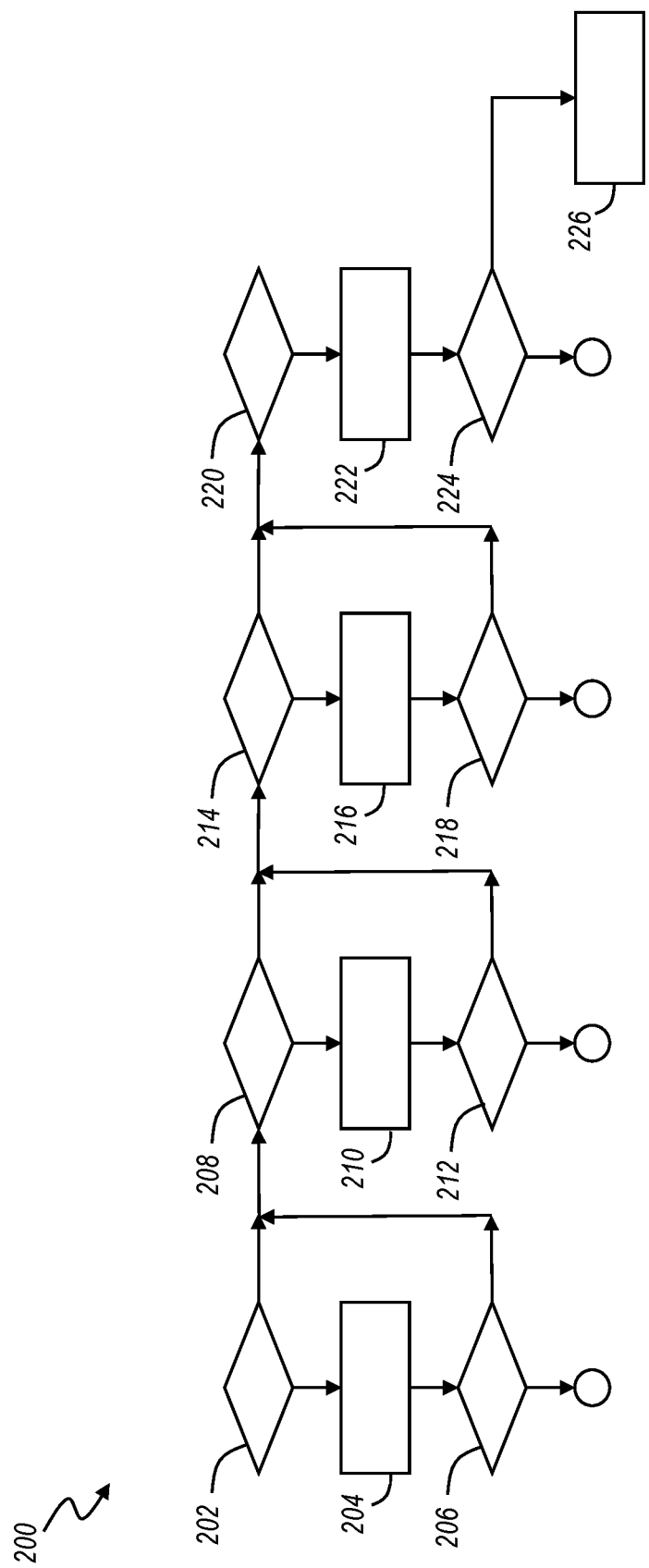
FIG. 2 is a flow chart of one example of a method of operating the mobile communication system of FIG. 1.

Referring to FIG. 2, there is illustrated one example of a method 200 of operating the mobile communication system 102 of FIG. 1 to provide the ECU 104 engaging in a voice call on one of multiple voice channels. The method 200 commences at block 202 with the controller 114 receiving a voice call request and determining whether an IMS network is available for a VoNR call. If the controller 114 determines that the IMS network is available for the VoNR call, the method proceeds to block 204. If the controller 114 determines that the IMS network is not available for the VoNR call, the method proceeds to block 208.

At block 204, the controller 114 initiates a timer 120 and operates the ECU 104 in a first IMS mode in which the ECU 104 attempts to engage in the VoNR call via the IMS network. More specifically, the ECU 104 attempts to engage in the VoNR call via a single non-standalone LTE network. In other examples, the ECU 104 attempts to engage in the VoNR call via a standalone network for a 5G call. The controller 114 repeatedly operates the ECU 104 in the first IMS mode to attempt to engage in the VoNR call within a predetermined amount of time until the ECU 104 successfully engages in the VoNR call. Also, in this example, the controller 114 initiates a counter 122 to count a number of unsuccessful attempts by the ECU 104 to engage in the VoNR call and increments the counter 122 for each unsuccessful attempt.

At block 206, the controller 114 determines whether the ECU 104 in the first IMS mode successfully engaged in the VoNR call within the predetermined amount of time. If the controller 114 determines that the ECU 104 in the first IMS mode successfully engaged in the VoNR call within a predetermined number of attempts and within the predetermined amount of time, the method 200 terminates. If the controller 114 determines that the ECU 104 in the first IMS mode did not successfully engage in the VoNR call within the predetermined number of attempts and within the predetermined amount of time, the method 200 proceeds to block 208.

At block 208, the controller 114 determines whether an IMS network is available for a VoLTE call. If the controller 114 determines that the IMS network is available for the VoLTE call, the method 200 proceeds to block 210. If the controller 114 determines that the IMS network is not available for the VoLTE call, the method 200 proceeds to block 214.

At block 210, the controller 114 resets the timer 120 and operates the ECU 104 in a second IMS mode in which the ECU 104 attempts to engage in the VoLTE call via the IMS network. More specifically, the ECU 104 attempts to engage in the VoLTE call via the single non-standalone LTE network. In other non-limiting examples, the ECU 104 attempts to engage in the VoLTE call via a standalone network for a 4G call. The controller 114 repeatedly operates the ECU 104 in the second IMS mode to attempt to engage in the VoLTE call within a predetermined amount of time until the ECU 104 successfully engages in the VoLTE call. Also, in this example, the controller 114 resets counter 122 to count a number of unsuccessful attempts by the ECU 104 to engage in the VoLTE call and increments the counter 122 for each unsuccessful attempt.

At block 212, the controller 114 determines whether the ECU 104 in the second IMS mode successfully engaged in the VoLTE call within the predetermined amount of time. If the controller 114 determines that the ECU 104 in the second IMS mode successfully engaged in the VoLTE call within a predetermined number of attempts and within the predetermined amount of time, the method 200 terminates. If the controller 114 determines that the ECU 104 in the second IMS mode did not successfully engage in the VoLTE call within the predetermined number of attempts and within the predetermined amount of time, the method 200 proceeds to block 214.

At block 214, the controller 114 determines an availability of an Internet Protocol network (IP network) via a Wi-Fi connection or other suitable wireless or wired connection for a VoIP call. If the controller 114 determines that the IP network is available, the method 200 proceeds to block 216. If the controller 114 determines that the IP network is not available, the method 200 proceeds to block 220.

At block 216, the controller 114 resets the timer 120 and operates the ECU 104 in an IP mode in which the ECU 104 attempts to engage in the VoIP call via the IP network. The controller 114 repeatedly operates the ECU 104 in the VoIP mode to attempt to engage in the VoIP call within a predetermined amount of time until the ECU 104 successfully engages in the VoIP call. Also, in this example, the controller 114 resets the counter 122 for counting a number of unsuccessful attempts by the ECU 104 to engage in the VoIP call and increments the counter 122 for each unsuccessful attempt.

At block 218, the controller 114 determines whether the ECU 104 in the IP mode successfully engaged in the VoIP call within the predetermined amount of time. If the controller 114 determines that the ECU 104 in the IP mode successfully engaged in the VoIP call within a predetermined number of attempts and within the predetermined amount of time, the method 200 terminates. If the controller 114 determines that the ECU 104 in the IP mode did not successfully engaged in the VoIP call within the predetermined number of attempts and within the predetermined amount of time, the method 200 proceeds to block 220.

At block 220, the controller 114 determines whether an IMS network is available for a Circuit Switched Fallback (CSFB) call. If the controller 114 determines that the IMS network is available for the CSFB call, the method 200 proceeds to block 222. If the controller 114 determines that the IMS network is not available for the CSFB call, the method 200 proceeds to block 226.

At block 222, the controller 114 resets the timer 120 and operates the ECU 104 in a third IMS mode in which the ECU 104 attempts to engage in the CSFB call via the IMS network. More specifically, the ECU 104 attempts to engage in the CSFB call via the single non-standalone network. In other examples, the ECU 104 attempts to engage in the CSFB call via a standalone network for a 3G call. The controller 114 repeatedly operates the ECU 104 in the third IMS mode to attempt to engage in the CSFB call within a predetermined amount of time until the ECU 104 successfully engages in the CSFB call. Also, in this example, the controller 114 resets the counter 122 to count a number of unsuccessful attempts by the ECU 104 to engage in the CSFB call and increments the counter 122 for each unsuccessful attempt.

At block 224, the controller 114 determines whether the ECU 104 in the second IMS mode successfully engaged in the VoLTE call within the predetermined amount of time. If the controller 114 determines that the ECU 104 in the third IMS mode successfully engaged in the CSFB call within a predetermined number of attempts during the predetermined amount of time, the method 200 terminates. If the controller 114 determines that the ECU 104 in the third IMS mode did not successfully engage in the CSFB call within the predetermined number of attempts during the predetermined amount of time, the method 200 proceeds to block 226.

At block 226, the controller 114 generates a call failure signal received by a notification device 124 that indicates that the call has failed, in response to the notification device 124 receiving the call failure signal. In one example, the notification device can be a speaker for playing an audible voice recording, a chime, or other audible notification that the call has failed. In another example, the notification device can be a display device, such as touch screen or a lamp mounted to an instrument panel.

Referring to FIG. 3, there is illustrated another example of a method 300 of operating the mobile communication system 102 of FIG. 1 to provide the ECU 104 engaging in a voice call on one of multiple voice channels. The method 300 commences at block 302 with a controller 114 determining an availability of an IMS network based on at least one of a bit error rate, a cellular signal, and a service fee associated with the IMS network. If the controller 114 determines that the bit error rate is above an error threshold value, the cellular signal is below a signal threshold value, or the service fee associated with the IMS network is above a fee threshold value; and the IP network is available via the Wi-Fi connection, the method 300 proceeds to block 304. If the controller 114 determines that the bit error rate is below the error threshold value, the cellular signal is above the signal threshold value, the service fee associated with the IMS network is below a fee threshold value, and the IMS network is available, the method 300 proceeds to block 308.

At block 304, the controller 114 initiates a timer 120 and operates the ECU 104 in an IP mode in which the ECU 104 attempts to engage in a VoIP call via an IP network. The controller 114 repeatedly operates the ECU 104 in the VoIP mode to attempt to engage in the VoIP call within a predetermined amount of time until the ECU 104 successfully engages in the VoIP call. Also, in this example, the controller 114 initiates a counter 122 for counting a number of unsuccessful attempts by the ECU 104 to engage in the VoIP call and increments the counter 122 for each unsuccessful attempt.

At block 306, the controller 114 determines whether the ECU 104 in the IP mode successfully engaged in the VoIP call within the predetermined amount of time. If the controller 114 determines that the ECU 104 in the IP mode successfully engaged in the VoIP call within a predetermined number of attempts and within the predetermined amount of time, the method 300 terminates. If the controller 114 determines that the ECU 104 in the IP mode did not successfully engaged in the VoIP call within the predetermined number of attempts and within the predetermined amount of time, the method 300 proceeds to block 308.

At block 308, the controller 114 determines whether an IMS network is available for a VoNR call. If the controller 114 determines that the IMS network is available for the VoNR call, the method proceeds to block 310. If the controller 114 determines that the IMS network is not available for the VoNR call, the method proceeds to block 314.

At block 310, the controller 114 resets the timer 120 and operates the ECU 104 in a first IMS mode in which the ECU 104 attempts to engage in the VoNR call via the IMS network. More specifically, the ECU 104 attempts to engage in the VoNR call via a single non-standalone LTE network. In other examples, the ECU 104 attempts to engage in the VoNR call via a standalone network for a 5G call. The controller 114 repeatedly operates the ECU 104 in the first IMS mode to attempt to engage in the VoNR call within a predetermined amount of time until the ECU 104 successfully engages in the VoNR call. Also, in this example, the controller 114 resets the counter 122 to count a number of unsuccessful attempts by the ECU 104 to engage in the VoNR call and increments the counter 122 for each unsuccessful attempt.

At block 312, the controller 114 determines whether the ECU 104 in the first IMS mode successfully engaged in the VoNR call within the predetermined amount of time. If the controller 114 determines that the ECU 104 in the first IMS mode successfully engaged in the VoNR call within a predetermined number of attempts and within the predetermined amount of time, the method 300 terminates. If the controller 114 determines that the ECU 104 in the first IMS mode did not successfully engage in the VoNR call within the predetermined number of attempts and within the predetermined amount of time, the method 300 proceeds to block 314.

At block 314, the controller 114 determines whether an IMS network is available for a VoLTE call. If the controller 114 determines that the IMS network is available for the VoLTE call, the method 300 proceeds to block 316. If the controller 114 determines that the IMS network is not available for the VoLTE call, the method 300 proceeds to block 320.

At block 316, the controller 114 resets the timer 120 and operates the ECU 104 in a second IMS mode in which the ECU 104 attempts to engage in the VoLTE call via the IMS network. More specifically, the ECU 104 attempts to engage in the VoLTE call via the single non-standalone LTE network. In other examples, the ECU 104 attempts to engage in the VoLTE call via a standalone network for a 4G call. The controller 114 repeatedly operates the ECU 104 in the second IMS mode to attempt to engage in the VoLTE call within a predetermined amount of time until the ECU 104 successfully engages in the VoLTE call. Also, in this example, the controller 114 resets counter 122 to count a number of unsuccessful attempts by the ECU 104 to engage in the VoLTE call and increments the counter 122 for each unsuccessful attempt.

At block 318, the controller 114 determines whether the ECU 104 in the second IMS mode successfully engaged in the VoLTE call within the predetermined amount of time. If the controller 114 determines that the ECU 104 in the second IMS mode successfully engaged in the VoLTE call within a predetermined number of attempts and within the predetermined amount of time, the method 300 terminates. If the controller 114 determines that the ECU 104 in the second IMS mode did not successfully engage in the VoLTE call within the predetermined number of attempts and within the predetermined amount of time, the method 300 proceeds to block 320.

At block 320, the controller 114 determines whether an IMS network is available for a CSFB call. If the controller 114 determines that the IMS network is available for the CSFB call, the method 300 proceeds to block 322. If the controller 114 determines that the IMS network is not available for the CSFB call, the method 300 proceeds to block 326.

At block 322, the controller 114 resets the timer 120 and operates the ECU 104 in a third IMS mode in which the ECU 104 attempts to engage in the CSFB call via the IMS network. More specifically, the ECU 104 attempts to engage in the CSFB call via the single non-standalone network. In other examples, the ECU 104 attempts to engage in the CSFB call via a standalone network for a 3G call. The controller 114 repeatedly operates the ECU 104 in the third IMS mode to attempt to engage in the CSFB call within a predetermined amount of time until the ECU 104 successfully engages in the CSFB call. Also, in this example, the controller 114 resets the counter 122 to count a number of unsuccessful attempts by the ECU 104 to engage in the CSFB call and increments the counter 122 for each unsuccessful attempt.

At block 324, the controller 114 determines whether the ECU 104 in the second IMS mode successfully engaged in the VoLTE call within the predetermined amount of time. If the controller 114 determines that the ECU 104 in the third IMS mode successfully engaged in the CSFB call within a predetermined number of attempts during the predetermined amount of time, the method 300 terminates. If the controller 114 determines that the ECU 104 in the third IMS mode did not successfully engage in the CSFB call within the predetermined number of attempts during the predetermined amount of time, the method 300 proceeds to block 326.

At block 326, the controller 114 generates a call failure signal received by a notification device 124 that indicates that the call has failed, in response to the notification device 124 receiving the call failure signal. In one example, the notification device can be a speaker for playing an audible voice recording, a chime, or other audible notification that the call has failed. In another example, the notification device can be a display device, such as touch screen or a lamp mounted to an instrument panel.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method of operating a mobile communication system of a motor vehicle for initiating a voice call with a third party, the mobile communication system including an electronic control unit (ECU) served by first and second IP Multimedia Subsystem (IMS) networks, the ECU having a controller and a memory storing computer code, the method comprising the steps of:
- (a) initiating, using the controller, a timer;
- (b) operating, using the controller, the ECU in a first IMS mode in which the ECU attempts to engage in a Voice Over New Radio (VoNR) call via the first IMS network;
- (c) repeating step (b) within a predetermined amount of time until the ECU engages in the VoNR call;
- (d) operating, using the controller, the ECU in a second IMS mode to attempt to engage in a Voice Over Long Term Evolution (VoLTE) call via the second IMS network in response to the controller determining that the ECU in the first mode did not engage in the VoNR call within the predetermined amount of time;
- (e) initiating, using the controller, a counter to count a number of attempts by the ECU in the first IMS mode to engage in the VoNR call;
- (f) incrementing, using the controller, the counter for each attempt by the ECU in the first IMS mode to engage in the VoNR call; and
- (g) operating, using the controller, the ECU in the second IMS mode to attempt to engage in the VoLTE call in response to the controller determining that the ECU in the first IMS mode did not engage in the VoNR call within a predetermined number of attempts.

2. The method of claim 1 further comprising:
resetting, using the controller, the timer in response to the controller determining that the ECU in the first IMS mode did not successfully engage in the VoNR call within the predetermined amount of time; and
operating, using the controller, the ECU in an Internet Protocol mode (IP mode) to attempt to engage in a Voice Over Internet Protocol (VoIP) call via an Internet Protocol network (IP network) in response to the controller determining that the ECU in the second mode did not successfully engage in the VoLTE call within the predetermined amount of time.

3. The method of claim 2 further comprising:
initiating, using the controller, a counter to count a number of unsuccessful attempts by the ECU in the second IMS mode to engage in the VoLTE call;
incrementing, using the controller, the counter for each unsuccessful attempt of the ECU in the second IMS mode to engage in the VoLTE call; and
operating, using the controller, the ECU in the IP mode to attempt to engage in the VoIP call via the IP network in response to the controller determining that the ECU in the second IMS mode did not successfully engage in the VoLTE call within a predetermined number of attempts.

4. The method of claim 2 further comprising:
resetting, using the controller, the timer in response to the controller determining that the ECU in the second IMS mode did not successfully engage in the VoLTE call within the predetermined amount of time; and
operating, using the controller, the ECU in a third IMS mode to attempt to engage in a Circuit Switched Fallback (CSFB) call via a third IMS network in response to the controller determining that the ECU in the IP mode did not successfully engage in the VoIP call within the predetermined amount of time.

5. The method of claim 4 further comprising:
initiating, using the controller, a counter to count a number of unsuccessful attempts by the ECU in the IP mode to engage in the VoIP call via the IP network;
incrementing, using the controller, the counter for each unsuccessful attempt of the ECU in the IP mode to engage in the VoIP call; and
operating, using the controller, the ECU in the third IMS mode to attempt to engage in the CSFB call in response to the controller determining that the ECU in the IP mode did not successfully engage in the VoIP call within a predetermined number of attempts.

6. The method of claim 4 wherein the steps of operating the ECU in first and second IMS modes via the first and second IMS networks comprise operating the ECU on a single non-standalone network.

7. A method of operating a mobile communication system of a motor vehicle for initiating a voice call with a third party, the mobile communication system including an electronic control unit (ECU) served by first and second networks, the ECU having a controller and a memory storing computer code for execution by the controller, the method comprising:
- (a) initiating, using the controller, a timer;
- (b) operating, using the controller, the ECU in a first mode in which the ECU attempts to engage in the voice call via the first network;
- (c) repeating step (b) within a predetermined amount of time until the ECU engages in the voice call;
- (d) operating, using the controller, the ECU in a second mode to attempt to engage in the voice call via the second network in response to the controller determining that the ECU in the first mode did not engage in the voice call within the predetermined amount of time;
- (e) initiating, using the controller, a counter to count a number of attempts by the ECU in the first mode to engage in the voice call;
- (f) incrementing, using the controller, the counter for each attempt of the ECU in the first mode to engage in the voice call; and
- (g) operating, using the controller, the ECU in the second mode to attempt to engage in the voice call in response to the controller determining that the ECU in the first mode did not engage in the voice call within a predetermined number of attempts.

8. The method of claim 7 further comprising:
providing the first network in the form of an IMS network and the second network in the form of an IP network;
determining, using the controller, an availability of the IMS network based on at least one of a bit error rate, a cellular signal, and a service fee associated with the IMS network;
determining, using the controller, an availability of the IP network via a Wi-Fi connection;
operating, using the controller, the ECU to attempt to engage in a Voice Over Internet Protocol call (VoIP call) via the IP network in response to the controller determining that at least one of:
the bit error rate is above an error threshold value;
the cellular signal is below a signal threshold value;
the service fee is above a fee threshold value; and
the IP network is available via the Wi-Fi connection; and
operating, using the controller, the ECU to attempt to engage in a Voice Over New Radio call (VoNR call) via the IMS network in response to the controller determining that at least one of:
the bit error rate is below the error threshold value;
the cellular signal is above the signal threshold value;
the service fee is below the fee threshold value; and
the IMS network is available.

9. The method of claim 7 further comprising:
resetting, using the controller, the timer in response to the controller determining that the ECU in the first mode did not successfully engage in the voice call within the predetermined amount of time; and
operating, using the controller, the ECU in a third mode to attempt to engage in the voice call via a third network in response to the controller determining that the ECU in the second mode did not successfully engage in the voice call within the predetermined amount of time.

10. The method of claim 9 further comprising:
initiating, using the controller, a counter to count a number of unsuccessful attempts by the ECU in the second mode to engage in the voice call;
incrementing, using the controller, the counter for each unsuccessful attempt of the ECU in the second mode to engage in the voice call; and
operating, using the controller, the ECU in the third mode to attempt to engage in the voice call via the third network in response to the controller determining that the ECU in the second mode did not successfully engage in the voice call within a predetermined number of attempts.

11. The method of claim 9 further comprising:
resetting, using the controller, the timer in response to the controller determining that the ECU in the third mode did not successfully engage in the voice call within the predetermined amount of time; and
operating, using the controller, the ECU in a fourth mode to attempt to engage in the voice call via a fourth network in response to the controller determining that the ECU in the third mode did not successfully engage in the voice call within the predetermined amount of time.

12. The method of claim 11 further comprising:
initiating, using the controller, a counter to count a number of unsuccessful attempts by the ECU in the third mode to engage in the voice call via the third network;
incrementing, using the controller, the counter for each unsuccessful attempt of the ECU in the third mode to engage in the voice call; and
operating, using the controller, the ECU in the fourth mode to attempt to engage in the voice call in response to the controller determining that the ECU in the third mode did not successfully engage in the voice call within a predetermined number of attempts.

13. A mobile communication system of a motor vehicle, the mobile communication system comprising:
an electronic control unit (ECU) served by first and second networks for initiating a voice call with a remote third party, wherein the ECU comprises:
a controller; and
a memory storing computer code for execution by the controller, with the computer code configured to at least:
(a) initiate a timer;
(b) operate the ECU in a first mode in which the ECU attempts to engage in a Voice Over New Radio (VoNR) call via the first network;
(c) repeat step (b) within a predetermined amount of time until the ECU engages in the VoNR call;
(d) operate the ECU in a second mode to attempt to engage in a Voice Over Long Term Evolution (VoLTE) call via the second network in response to the controller determining that the ECU in the first mode did not engage in the VoNR call within the predetermined amount of time;
(e) initiate a counter to count a number of attempts by the ECU in the first mode to engage in the voice call;
(f) increment the counter for each attempt by the ECU in the first mode to engage in the voice call; and
(g) operate the ECU in the second mode to attempt to engage in the voice call in response to the controller determining that the ECU in the first mode did not engage in the voice call within a predetermined number of attempts.

14. The mobile communication system of claim 13 wherein the computer code is further configured to at least:
reset the timer and reset the counter to count a number of unsuccessful attempts by the ECU in the second mode to engage in the voice call in response to the controller determining that the ECU in the first mode did not successfully engage in the voice call within the predetermined amount of time;
increment the counter for each unsuccessful attempt by the ECU in the second mode to engage in the voice call; and
operate the ECU in a third mode to attempt to engage in the voice call via a third network in response to the controller determining that at least one of:
the ECU in the second mode did not successfully engage in the voice call within the predetermined amount of time; and
the ECU in the second mode did not successfully engage in the voice call within a predetermined number of attempts.

15. The mobile communication system of claim 14 wherein the computer code is further configured to:
reset the timer and reset the counter to count a number of unsuccessful attempts by the ECU in the third mode to engage in the voice call in response to the controller determining that the ECU in the second mode did not successfully engage in the voice call within the predetermined amount of time;
increment the counter for each unsuccessful attempt of the ECU in the third mode to engage in the voice call; and
operate the ECU in a fourth mode to attempt to engage in the voice call via a fourth network in response to the controller determining that at least one of:
the ECU in the third mode did not successfully engage in the voice call within the predetermined amount of time; and
the ECU in the third mode did not successfully engage in the voice call via the third network within a predetermined number of attempts;
wherein the steps of operating the ECU in first and second modes on the associated first and second networks comprise operating the ECU on a single non-standalone network.

16. The mobile communication system of claim 15 wherein the voice call in the first mode is a Voice Over New Radio (VoNR) call, the voice call in the second mode is a Voice Over Long Term Evolution (VoLTE) call, the voice call in the third mode is a Voice Over Internet Protocol (VoIP) call, and the voice call in the fourth mode is a Circuit Switched Fallback (CSFB) call.

17. The mobile communication system of claim 15 wherein two of the networks comprise an IMS network and an IP network, and the computer code is further configured to:

determine an availability of the IMS network based on at least one of a bit error rate, a cellular signal, and a service fee associated with the IMS network;
determine an availability of the IP network via a Wi-Fi connection;
operate the ECU to attempt to engage in the voice call via the IP network in response to the controller determining that at least one of:
   the bit error rate is above an error threshold value;
   the cellular signal is below a signal threshold value;
   the service fee is above a fee threshold value; and
   the IP network is available via the Wi-Fi connection;
operate the ECU to attempt to engage in the voice call via the IMS network in response to the controller determining that at least one of:
   the bit error rate is below the error threshold value;
   the cellular signal is above the signal threshold value;
   the service fee is below the fee threshold value; and
   the IMS network is available.

* * * * *